US00RE43199E

(19) United States
(12) Reissued Patent
Fossli

(10) Patent Number: US RE43,199 E
(45) Date of Reissued Patent: Feb. 21, 2012

(54) ARRANGEMENT AND METHOD FOR REGULATING BOTTOM HOLE PRESSURES WHEN DRILLING DEEPWATER OFFSHORE WELLS

(75) Inventor: Borre Fossli, Oslo (NO)

(73) Assignee: Ocean Rider Systems AS, Oslo (NO)

(21) Appl. No.: 12/256,740

(22) Filed: Oct. 23, 2008

Related U.S. Patent Documents

Reissue of:
(64) Patent No.: 7,264,058
Issued: Sep. 4, 2007
Appl. No.: 10/489,236
PCT Filed: Sep. 10, 2002
PCT No.: PCT/NO02/00317
§ 371 (c)(1),
(2), (4) Date: Mar. 10, 2004
PCT Pub. No.: WO03/023181
PCT Pub. Date: Mar. 20, 2003

U.S. Applications:
(60) Provisional application No. 60/318,391, filed on Sep. 10, 2001.

(51) Int. Cl.
*E21B 17/01* (2006.01)

(52) U.S. Cl. ..... 166/367; 166/364; 175/5; 175/25; 175/38; 175/72

(58) Field of Classification Search ..... None
See application file for complete search history.

(56) References Cited

U.S. PATENT DOCUMENTS 3,465,817 A * 9/1969 Vincent ..... 166/355
3,815,673 A * 6/1974 Bruce et al. ..... 166/359
4,046,191 A 9/1977 Neath
4,063,602 A 12/1977 Howell
4,091,881 A 5/1978 Maus
4,099,583 A 7/1978 Maus
4,210,208 A * 7/1980 Shanks ..... 166/352
4,220,207 A 9/1980 Allen
4,291,722 A 9/1981 Churchman
4,291,772 A 9/1981 Beynet
4,414,846 A * 11/1983 Dublin et al. ..... 73/152.52
4,813,495 A * 3/1989 Leach ..... 175/6
5,006,845 A * 4/1991 Calcar et al. ..... 367/81
5,727,640 A * 3/1998 Gleditsch ..... 175/7

(Continued)

FOREIGN PATENT DOCUMENTS

EP 0290250 A2 11/1988

(Continued)

OTHER PUBLICATIONS

NO Search Report dated Feb. 15, 2005 of Patent Application No. PCT/NO02/00317 filed Sep. 10, 2002.

*Primary Examiner* — Thomas A Beach
(74) *Attorney, Agent, or Firm* — Vern Maine & Associates

(57) ABSTRACT

An arrangement and a method to control and regulate the bottom hole pressure in a well during subsea drilling at deep waters: The method involves adjustment of a liquid/gas interface level in a drilling riser up or down. The arrangement comprises a high pressure drilling riser and a surface BOP at the upper end of the drilling riser. The surface BOP havs a gas bleeding outlet. The riser also comprises a BOP, with a bypass line. The drilling riser has an outlet at a depth below the water surface, and the outlet is connected to a pumping system with a flow return conduit running back to a drilling vessel/platform.

17 Claims, 7 Drawing Sheets

U.S. PATENT DOCUMENTS

| | | | | |
|---|---|---|---|---|
| 5,848,656 | A * | 12/1998 | Møksvold | 175/7 |
| 6,102,673 | A * | 8/2000 | Mott et al. | 417/392 |
| 6,263,981 | B1 | 7/2001 | Gonzalez | |
| 6,276,455 | B1 | 8/2001 | Gonzalez | |
| 6,325,159 | B1 * | 12/2001 | Peterman et al. | 175/7 |
| 6,328,107 | B1 * | 12/2001 | Maus | 166/335 |
| 6,401,823 | B1 * | 6/2002 | Gonzalez et al. | 166/319 |
| 6,415,877 | B1 * | 7/2002 | Fincher et al. | 175/5 |
| 6,454,022 | B1 | 9/2002 | Sangesland | |
| 6,457,529 | B2 * | 10/2002 | Calder et al. | 166/368 |
| 6,474,422 | B2 * | 11/2002 | Schubert et al. | 175/69 |
| 6,571,873 | B2 | 6/2003 | Maus | |
| 6,648,081 | B2 | 11/2003 | Fincher | |
| 6,668,943 | B1 * | 12/2003 | Maus et al. | 175/5 |
| 6,745,857 | B2 * | 6/2004 | Gjedebo | 175/69 |
| 6,823,950 | B2 * | 11/2004 | von Eberstein et al. | 175/5 |
| 6,854,532 | B2 | 2/2005 | Fincher | |
| 7,677,329 | B2 | 3/2010 | Stave | |

FOREIGN PATENT DOCUMENTS

| | | |
|---|---|---|
| FR | 2787827 | 4/1999 |
| FR | 2787827 | 6/2000 |
| WO | 9918327 A1 | 4/1999 |

* cited by examiner

ARRANGEMENT AND METHOD FOR REGULATING BOTTOM HOLE PRESSURES WHEN DRILLING DEEPWATER OFFSHORE WELLS

Matter enclosed in heavy brackets [ ] appears in the original patent but forms no part of this reissue specification; matter printed in italics indicates the additions made by reissue.

*RELATED APPLICATIONS*

*This application is a U.S. National Phase Application of PCT Application No. PCT/NO02/00317, filed Sep. 10, 2002, which claims the benefit of U.S. Provisional Application No. 60/318,391, filed Sep. 10, 2001. Each of these applications is herein incorporated in its entirety by reference.*

FIELD OF THE INVENTION

The present invention relates to a particular arrangement for use when drilling oil and gas wells from offshore structures that float on the surface of the water in depths typically greater than 500 m above seabed. More particularly, it describes a drilling riser system so arranged that the pressure in the bottom of an underwater borehole can be controlled in a completely novel way, and that the hydrocarbon pressure from the drilled formation can be handled in an equally new and safe fashion in the riser system itself.

BACKGROUND OF THE INVENTION

This invention defines a particular novel arrangement, which can reduce drilling costs in deep ocean and greatly improve the safe handling of the hydrocarbon gas or liquids that may escape the subsurface formation below seabed and then pumped from the subsurface formation with the drilling fluid to the drilling installation that floats on the ocean surface. By performing drilling operations with this novel arrangement as claimed, there is provided a complete new way of controlling the pressure in the bottom of the well and at the same time safely and efficiently handling hydrocarbons in the drilling riser system. The arrangement comprises the use of prior known art but arranged so that totally new drilling methods is achieved. By arranging the various systems coupled to the drilling riser in this particular way, totally new and never before used methods can be performed safely in deepwater. The invention relates to a deep water drilling system, and more specifically to an arrangement for use in drilling of oil/gas wells, especially for deep water wells, preferably deeper than 500 m water-depth.

Experience from deepwater drilling operations has shown that the subsurface formations to be drilled usually have a fracture strength close to that of the pressure caused by a column of seawater.

As the hole deepens the difference between the formation pore pressure and the formation fracture pressure remains low. The low margin dictates that frequent and multiple casing strings have to be set in order to isolate the upper rock sections that have lower strength from the hydraulic pressure exerted by the drilling fluid that is used to control the larger formation pressures deeper in the well. In addition to the static hydraulic pressure acting on the formation from a standing column of fluid in the well bore there are also the dynamic pressures created when circulating fluid through the drill bit. These dynamic pressures acting on the bottom of the hole are created when drill fluid is pumped through the drill bit and up the annulus between the drill string and formation. The magnitude of these forces depends on several factors such as the rheology of the fluid, the velocity of the fluid being pumped up the annulus, drilling speed and the characteristics of the well bore/hole. Particularly for smaller diameter hole sizes these additional dynamic forces become significant. Presently these forces are controlled by drilling relatively large holes thereby keeping the annular velocity of the drilling fluid low and by adjusting the rheology of the drilling fluid. The formula for calculating these dynamic pressures is stated in the following detailed description. This new pressure seen by the formation in the bottom of the hole caused by the drilling process is often referred to as Equivalent Circulating Density (ECD).

In all present drilling operations to date in offshore deepwater wells, the bottom of the well will observe the combined hydrostatic pressure exerted by the column of fluid from the drilling vessel to the bottom of the well, plus the additional pressures due to circulation. A drilling riser that connects the seabed wellhead with the drilling vessel contains this drilling fluid. The bottom-hole pressure to overcome the formation pressure is regulated by increasing or decreasing the density of the drilling fluids in conventional drilling until the casing has to be set in order to avoid fracturing the formation.

In order to safely conduct a drilling operation there has to be a minimum of two barriers in the well. The primary barrier will be the drilling fluid in the borehole with sufficient density to control the formation pressure, also necessary in the event that the drilling riser is disconnected from the wellhead. This difference in pressure caused by the difference in density between seawater and the drilling fluid can be substantial in deep water. The second barrier will be the blowout preventer BOP (BOP) in case the primary barrier is lost.

As the drilling fluid must have a specific gravity such that the fluid remaining in the well is still heavy enough to control the formation when the drilling marine riser is disconnected, this creates a problem when drilling in deep waters. This is due to the fact that the marine riser will be full of heavy mud when connected to the sub sea blowout preventer, causing a higher bottom-hole pressure than required for formation control. This results in the need to set frequent casings in the upper part of the hole since the formation cannot support the higher mudweight from the surface.

In order to be able to drill wells with a higher density drilling fluid than necessary, multiple casings will be installed in the borehole for isolation of weak formation zones.

The consequences of multiple casing strings will be that each new casing reduces the borehole diameter. Hence the top section must be large in order to drill the well to its planned depth. This also means that slimhole or slender wells are difficult to construct with present methods in deeper waters.

Normally it is not possible to control the pressure from the surface in a conventional drilling operation, due to the fact that the well returns will flow into an open flow line at atmospheric pressure. In order to obtain wellhead pressure control, the well return has to be routed through a closed flow line by way of a closed blow out preventer to a choke manifold. The advantage of controlling bottom hole pressure by means of wellhead pressure control is that a pressure change at the surface results in an almost instantaneous pressure response at the bottom of the hole when a single-phase drilling fluid is used. In general, the surface pressure should be kept as low as possible to obtain safer working environment for the personnel working on the rig. So, it is preferable to control the well by changing pressures in the well bore to the largest extent.

Conventionally, this can be performed by means of hydrostatic pressure control and friction pressure control in the annulus.

Hydrostatic pressure control is the prime means of bottom hole pressure control in conventional drilling. The mud weight will be adjusted so that the well is in an overbalanced condition in the well when no drilling fluid circulation takes place. If needed, the mud weight/density can be changed depending on formation pressures. However, this is a time consuming process and requires adding chemicals and weighting materials to the drilling mud.

The other method for bottom hole pressure control is friction pressure control. Higher circulating rates generates higher friction pressure and consequently higher pressures in the bore hole. A change in pump rate will result in a rapid change in the bottom hole pressure (BHP). The disadvantage of using frictional pressure control is that control is lost when drilling fluid circulation is stopped. Frictional pressure loss is also limited by the maximum pump rate, the pressure rating of the pump and by the maximum flow through the down hole assembly.

The only reference referring to neutralization of ECD effects is found in SPE paper LIDC/SPE 47821. Reference in this paper is made to WO 99/18327.

All and each of the above references are hereby incorporated by reference.

SUMMARY OF THE INVENTION

The above prior art has many disadvantages. The object of the present invention is to avoid some or all of the disadvantages of the prior art.

Below some aspects of the present invention will be indicated.

In one aspect the present invention in a particular combination gives rise to new, practically feasible and safe methods of drilling deepwater wells from floating structures. In this aspect benefits over the prior art are achieved with improved safety. More precisely the invention gives instructions on how to control the hydraulic pressure exerted on the formation by the drilling fluid at the bottom of the hole being drilled by varying the liquid level in the drilling riser.

In another aspect the invention gives a particular benefit in well controlled situations (kick handling) or for planned drilling of wells with hydrostatic pressure from drilling fluid less that the formation pressure. This can involve continuous production of hydrocarbons from the underground formations that will be circulated to the surface with the drilling fluid. With this novel invention, both kick and handling of hydrocarbon gas can be safely and effectively controlled.

In still another aspect of the invention the riser liquid level will be lowered to a substantial depth below the sea-level with air or gas remaining in the riser above said level.

In contrast to prior art dual gradient systems an aspect of the present invention uses a single liquid gradient system, preferably drilling fluid (mud and/or completion fluid), with a gas (air) column on top.

In still another aspect the present invention has the combination of both a surface and a subsurface pressure containment (BOP). The present invention differs in this respect from U.S. Pat. No. 4,063,602 in that it includes the following features: a high pressure riser with a pressure integrity high enough to withstand a pressure equal to the maximum formation pressure expected to be encountered in the sub surface terrain, typically 3000 psi (200 bars) or higher; the riser is terminated in both ends by a high pressure containment system, such as a blow-out preventer; an outlet from the riser to a subsea pump system, typically substantially below the sea level and substantially above the seabed, which contains a back-pressure or non-return check valve; the sub-sea blowout preventer has an equalizing loop (by-pass) that will balance pressure below and above a closed subsea BOP, wherein the equalizing loop connects the subsea well with the riser; the loop has at least one, and preferably two, surface controllable valve(s).

There may be at least one choke line in the upper part of the drilling riser of equal or greater pressure rating than the drilling riser.

By incorporating the above features a well functioning system will be achieved that can safely perform drilling operations. The equalizing line can be used in a well control situation when and if a large gas influx has to be circulated out of the well.

In the present invention the high pressure riser and a high pressure drilling pipe may be so arranged between the subsea blowout preventer and the surface blowout preventer that they can be used as separate high pressure lines as a substitute for choke line and kill line.

In still another aspect the present invention incorporates this equalizing loop in combination with a lower than normal air/liquid interface level in the riser for well control purposes. This feature may be combined with a particular low level of drilling fluid in the riser. The well may not be closed in at the surface BOP while drilling with a low drilling fluid level in the riser, since it can take too long before the large amount of air would compress or the liquid level in the riser might not raise fast enough to prevent a great amount of influx coming into the well if a kick should occur. Hence, according to an aspect of the present invention, the well is closed in at the subsea BOP. However, since a high pressure riser with no outside kill and choke lines from the subsea BOP to the surface is used, the bypass loop is included in order to have the ability to circulate out a large influx past a closed subsea BOP into the high pressure riser. If the influx is gas, this gas can be bled off through the choke line in or under the closed surface BOP while the liquid is being pumped up the low riser return conduit through the low riser return outlet. This low riser return conduit and outlet has preferably a "gas-lock" U-tube form below the subsea return pumps, which will prevent the substantial part of the gas from being sucked into the pump system. If only small amount of hydrocarbon gas is present in the drilling riser, an air/gas compressor is installed in the normal flowline on surface, which will suck air from inside the drilling riser, creating a pressure below that of the atmospheric pressure above the riser. The compressor will discharge the air/gas to the burner boom or other safe gas vents on the platform. In still another aspect the liquid level (drilling mud) is kept relatively close to the outlet and the gas pressure is close to atmospheric pressure, resulting in a separation of the major part of the gas in the riser. The riser will in this aspect of the invention become a gas separation chamber.

In still another aspect of the invention the bypass loop in combination with the low riser return outlet will also give rise to many other useful and improved methods of kick, formation testing and contingency procedures. Hence this combination is a unique feature of the invention.

In still another aspect of the present invention, the bottom hole pressure is regulated without the need of a closed pressure containment element around the drill string anywhere in the system. Pressure containment will only be required in a well control situation or if pre-planned under-balanced drilling is being performed. The present invention specifies how the bottom hole pressure can be regulated during normal drilling operation and how the ECD effects can be neutralized.

The present invention presents the unique combination of a high-pressure riser system and a system with pressure barriers both on surface and on seabed, which coexists with the combination of a low level return system. The invention gives the possibility to compensate for both pressure increases (surge) and decreases (swab) effects from running pipe into the well or pulling pipe out of the well, in addition to and at the same time compensate for the dynamic pressures from the circulation process ECD . The invention relates in this aspect to how this control will be performed.

In an aspect the present invention overcomes many disadvantages of other attempts and meets the present needs by providing methods and arrangements whereby the fluid-level in the high pressure riser can be dropped below sea level and adjusted so that the hydraulic pressure in the bottom of the hole can be controlled by measuring and adjusting the liquid level in the riser in accordance with the dynamic drilling process requirements. Due to the dynamic nature of the drilling process the liquid level will not remain steady at a determined level but will constantly be varied and adjusted by the pumping control system. The liquid level can be anywhere between the normal return level on the drilling vessel above the surface BOP or at the depth of the low riser return section outlet. In this fashion the bottom-hole pressure is controlled with the help of the low riser return system. A pressure control system controls the speed of the subsea mud lift pump and actively manipulates the level in the riser so that the pressure in the bottom of the well is controlled as required by the drilling process.

The arrangements and methods of the present invention represents in still another aspect a new, faster and safer way of regulating and controlling bottom hole pressures when drilling offshore oil and gas wells. With the methods described it is possible to regulate the pressure in the bottom of the well without changing the density of the drilling fluid. The ability to control pressures in the bottom of the hole and at the same time and with the same equipment being able to contain and safely control the hydrocarbon pressure on surface makes the present invention and riser system completely new and unique. The combination will make the drilling process more versatile and give room for new and improved methods for drilling with bottom hole pressures less than pressure in the formation, as in under-balanced drilling.

The liquid/air interface level can also be used to compensate for friction forces in the bottom of the well while cementing casing and also compensate for surge and swab effects when running casing and/or drill pipe in or out of the hole while continuously circulating at the same time. To demonstrate this, the level in the annulus will be lower when pumping through the drill pipe and up the annulus than it will be when there is no circulation in the well. Similarly, the level will be higher than static when pulling the drill bit and bottom-hole assembly out of the open hole to compensate for the swabbing effect when pulling out of a tight hole.

The method of varying the fluid height can also be used to increase the bottom-hole pressure instead of increasing the mud density. Normally as drilling takes place deeper in the formations the pore pressure will also vary. In conventional drilling operation the drilling mud density has to be adjusted. This is time-consuming and expensive since additives have to be added to the entire circulating volume. With the low riser return system (LRRS) the density can remain the same during the entire drilling process, thereby reducing time for the drilling operations and reducing cost.

In contrast to the prior art, the level in the riser can be dropped at the same time as mud-weight is increased so as to reduce the pressure in the top of the drilled section while the bottom hole pressure is increased. In this way it is possible to reduce the pressure on weak formations higher up in the hole and compensate for higher pore pressures in the bottom of the hole. Thus it is be possible to rotate the pressure gradient line from the drilling mud around a fixed point, for example the seabed or casing shoe.

The advantage is that if an unexpected high pressure is encountered deep in the well, and the formation high up at the surface casing shoe cannot support higher riser return level or higher drilling fluid density at present return level, this can be compensated for by dropping the level in the riser further while increasing the mud weight. The combined effect will be a reduced pressure at the upper casing shoe while at the same time achieving higher pressure at the bottom of the hole without exceeding the fracture pressure below casing.

Another example of the ability of this system is to drill severely depleted formations without needing to turn the drilling fluid into gas, foam or other lighter than water drilling systems. A pore pressure of 0.7 SG (specific gravity) can be neutralized by low liquid level with seawater of 1.03 SG. This ability gives rise to great advantages when drilling in depleted fields, since reducing the original formation pressure 1.10 SG to 0.7 SG by production, can also give rise to reduced formation fracture pressure, that can not be drilled with seawater from surface. With the present invention the bottom-hole pressure exerted by the fluid in the well bore can be regulated to substantially below the hydrostatic pressure for water. With the prior art of drilling arrangements this will require special drilling fluid systems with gases, air or foam. With the present invention this can be achieved with simple seawater drilling fluid systems.

However and additionally, the system can be used for creating under-balanced conditions and to safely drill depleted formations in a safer and more efficient way than by radically adjusting drilling fluid density, as in conventional practice. In order to achieve this and in order to drill safely and effectively, the apparatus must be designed according to the present invention. The economical savings come from the novel combination according to the present invention.

The system can be used for conventional drilling with a surface BOP with returns to the vessel or drilling installation as normal with many added benefits in deepwater. The sub sea BOP can be greatly simplified compared to prior art where there is a sub sea BOP only. In the present invention the subsea BOP can be made smaller than conventional since fewer casings are needed in the well. Also since several functions, such as the annular preventer and at least one pipe ram is moved to the surface BOP on top of the drilling riser above sea-level, the total system is less expensive and will also open the way for new improved well control procedures. In addition there are no longer need for outside kill and choke lines running from the surface to the subsea BOP as in conventional drilling systems.

By having a surface blowout preventer on top of the drilling riser, all hydrocarbons can safely be bled off through the drilling rig's choke line manifold system.

Another aspect of the present invention is a loop forming a "water/gas-lock" in the circulating system below the subsea mudlift pump, which will prevent large amount of hydrocarbon gases from invading into the pump return system. The height of the pump section can easily be adjusted since it can be run on a separate conduit, thereby adjusting the height of the water lock. By preventing hydrocarbon gas entering the return conduit, the subsea mud return pump will operate more efficiently, and the rate at which the return fluid is pumped up the conduit can be controlled more precisely.

During normal operation the drilling riser will preferably be kept open to the atmosphere so that any vapour from hydrocarbons from the well will be vented off in the drilling riser. An air compressor will suck air/gas from the top of the drilling riser to the burner boom or other safe air vents on the drilling installation, and create a pressure below that of atmospheric pressure in the top of the riser system. Since the pressure in the drilling riser at the low riser return outlet line will be close to that of atmospheric pressure and substantially below the pressure in the pump return line, the majority of the gas will be separated from the liquid. If large amount of gases is released from the drilling mud in the riser, the surface BOP will have to be closed and the gas bled off through the choke-line 58 to the choke manifold system (not shown) on the drilling rig. A rotating head can be installed on the surface BOP hence the riser system can be used for continuous drilling under-balanced and gas can be handled safely by also having stripper elements arranged in the surface BOP system. Hence, this system can be used for under-balanced drilling purposes and can also be used for drilling highly depleted zones without having the need for aerated or foamed mud. This arrangement will make the riser function as a gas knock-out or first stage separator in an under-balanced or near balance drilling situation. This can save space topside, since the majority of gas is already separated and the return fluid is at atmospheric pressure at surface, meaning that the return fluid can be routed to the rig's conventional mud gas separator or "Poor-Boy degasser" from the subsea mud lift pump. For extreme cases the return fluid from the subsea mud return pumps might have to be routed through the choke manifold on the drilling rig or tender assist vessel alongside the drilling rig.

By using this novel drilling method and apparatus, great cost savings and improved well safety can be achieved compared to conventional drilling. The present invention will mitigate adverse effects of the prior art and at the same time open the way for new and never before possible operations in deeper waters.

If an under-balanced situation arises whereby the formation pressure is greater than the pressure exerted by the drilling fluid, and formation fluid is unexpectedly introduced into the well-bore, then the well can be controlled immediately with the arrangements and methods of the present invention by simply raising the fluid level in the high pressure riser. Alternately the well can be shut in with the subsea BOP. With the help of the by-pass line in the subsea BOP, the influx can be circulated out of the well and into the high pressure riser under constant bottom-hole pressure equal to the formation pressure. The potential gas that will separate out at the liquid/gas level (close to atmospheric pressure) in the riser will be vented out and controlled with the surface BOP.

The riser of the arrangements of the present invention preferably has no kill or chokes line, which is contrary to what is normal for most marine risers. Instead the annulus between the drill pipe and the riser becomes the choke line and the drill pipe becomes the kill line when needed when the subsea BOP is closed. This will greatly increase the operator's ability to handle unexpected pressures or other well control situations.

The arrangements and methods of the present invention, will in a specific new way make it possible to control and regulate the hydrostatic pressure exerted by the drilling fluid on the subsurface formations. It will be possible to dynamically regulate the bottom-hole pressure by lowering the level down to a depth below sea level. Bottom-hole pressures can be changed without changing the specific gravity of the drilling fluid. It will now be possible to drill an entire well without changing the density of the drilling fluid even though the formation pore-pressure is changing. It will also be possible to regulate the bottom-hole pressure in such a way that it can compensate for the added pressures due to fluid friction forces acting on the borehole while pumping and circulating drilling mud/fluids through a drill bit, up the annulus between the open hole/casing and the drill pipe.

The invention is also particularly suitable for use with coiled tubing apparatus and drilling operations with coiled tubing. The present invention will also be specifically usable for creating "underbalance" conditions where the hydraulic pressure in the well bore is below that of the formation and below that of the seawater hydrostatic pressure in the formation.

Hence having a distinct liquid level low in the well/riser and a low gas pressure in the wellbore/riser that in sum balances out the formation pressure, will not only make it possible to drill in-balance from floating rigs, it will to the a person of skill in the art open up a complete new set of possibilities that can not be achieved in shallow water or on land.

Since the drilling riser can be disconnected from a closed subsea BOP, it can be safer to drill under-balanced than from other installations that does not have this combination. The reason also is that the gas pressure in the riser is very low and will cause the drill string to be "pipe heavy" at all times, excluding the need for snubbing equipment or "pipe light" inverted slips in the drilling operation. If pressure build up in the gas/air phase cannot be kept low, a reduction in the riser pressure can be achieved by closing the subsea BOP and taking the return through the equalizing loop, thereby reducing the pressure in the riser. This stems from the fact that the friction pressure from fluid flowing in the reduced diameter of the equalizing loop will increase the bottom hole pressure, hence a reduced pressure in the drilling riser will be achieved.

The present invention specifies a solution that allows process-controlled drilling in a safe and practical manner.

DESCRIPTION OF THE DRAWINGS

These and other aspects of the present invention will be readily apparent to those skilled in the art from a review of the following detailed description of a preferred embodiment in conjunction with the accompanying drawings and claims. The drawings show in:

DETAILED DESCRIPTION OF THE INVENTION

Figure 1:
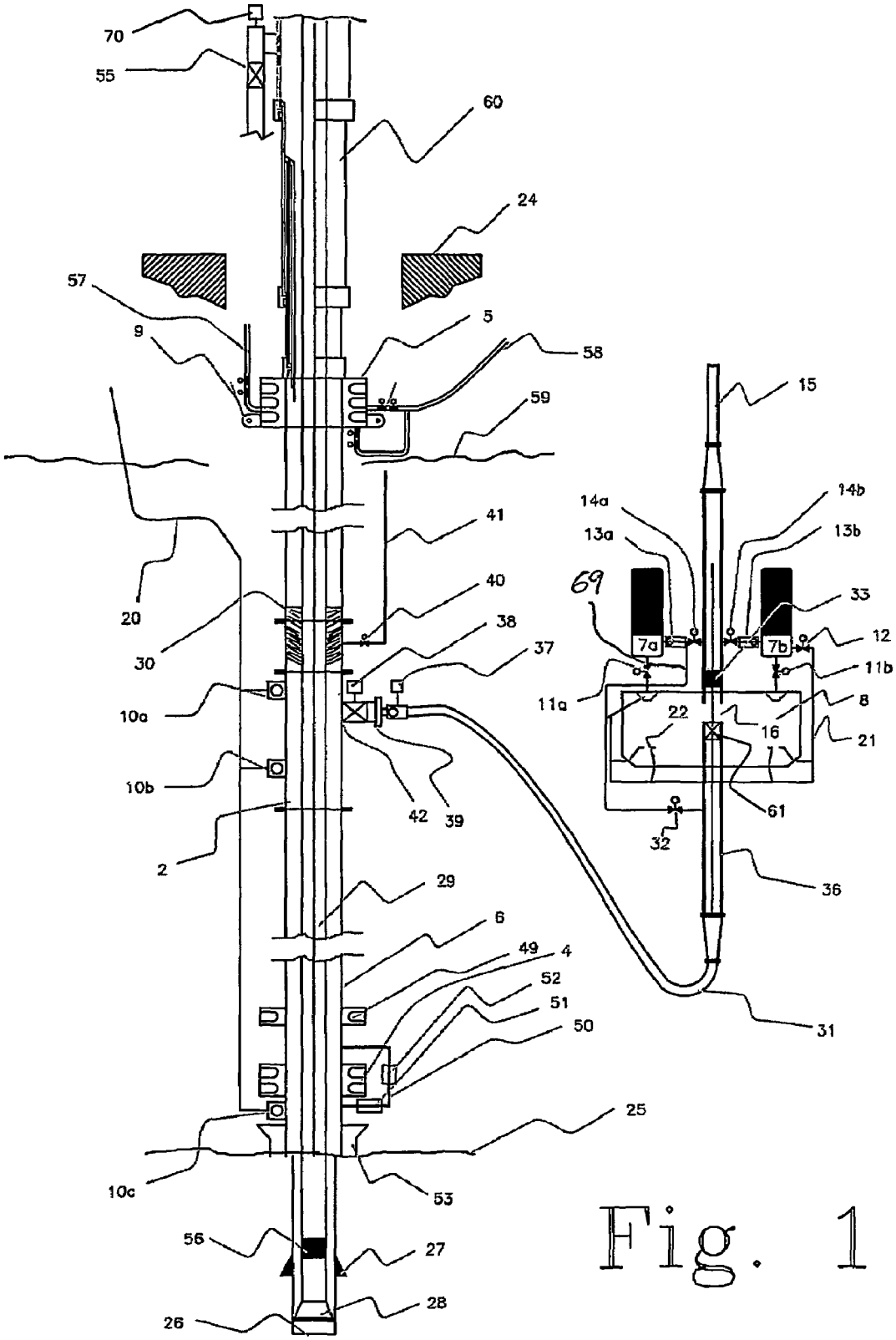
FIG. 1 a schematic overview of the arrangement.

In the following detailed description, taken in conjunction with the foregoing drawings, equivalent parts are given the same reference numerals.

FIG. 1 illustrates a drilling platform 24. The drilling platform 24 can be a floating mobile drilling unit or an anchored or fixed installation. Between the sea floor 25 and the drilling platform 24 is a high-pressure riser 6 extending, a subsea blowout preventer 4 is placed at the lower end of the riser 6 at the seabed 25, and a surface blowout preventer 5 is connected to the upper end of the high pressure riser 6 above or close to sealevel 59. The surface BOP has surface kill and choke line 58, 57, which is connected to the high pressure choke-manifold on the drilling rig (not shown). The riser 6, does not require outside kill and choke lines extending from subsea BOP to the surface. The subsea BOP 4 has a smaller bypass conduit 50 (typically 1-4" ID), which will communicate fluid between the well bore below a closed blowout preventer 4 and the riser 6. The by-pass line (equalizing line) 50 makes it possible to equalize between the well bore and the high pressure riser 6 when the BOP is closed. The by-pass line 50 has at least one, preferably two surface-controllable valves 51, 52

The blowout preventer 4 is in turn connected to a wellhead 53 on top of a casing 27, extending down into a well.

In the high pressure riser system a low riser return system (LRRS) riser section 2 can be placed at any location along the high pressure riser 6, forming an integral a part of the riser.

Near the lower end of the high pressure riser 6 a riser shutoff pressure containment element 49 is included, in order to close off the riser and circulate the high pressure riser to clean out any debris, gumbo or gas without changing the bottom-hole pressure in the well. In addition it is also possible to clean the riser 6 after it is disconnected from the subsea BOP 4 without spillage to the ocean.

Between the drilling platform/vessel 24 and the high-pressure riser 6 a riser tension system, schematically indicated by reference number 9, is installed.

The high-pressure riser includes a remotely monitored an upper pressure sensor 10a and a lower pressure sensor 10b. The sensor output signals are transmitted to the vessel 24 by, e.g., a cable 20, electronically or by fiber optics, or by radio waves or acoustic signals. The two sensors 10a and 10b measure the pressure in the drilling fluid at two different levels. Since the distance between the sensors 10a and 10b is predetermined, the density of the drilling fluid can be calculated. A remotely monitored pressure sensor 10c is also included in the subsea BOP 4, to supervise the pressure when the subsea BOP 4 is closed.

The high pressure riser 6 is a single bore high-pressure tubular and in contrary to traditional riser systems there is no requirement for separate circulation lines (kill or choke lines) along the riser, to be used for pressure control in the event oil and gas has unexpectedly entered the borehole 26. High pressure in the context of this invention is high enough to contain the pressures from the subsurface formations, typically, 3000 psi (200 bars) or higher.

Included in the high pressure riser system is the low riser return section (LRRS) 2 that can be installed anywhere along the riser length, the placement depending on the borehole to be drilled and the sea-water depth on the location. The riser section 2 contains a high-pressure valve 38 of equal or greater rating than the riser 6 and which can be controlled through the rotary table on the drilling rig.

FIG. 1 also shows a drill string 29 with a drill bit 28 installed in the borehole. Near the bottom of the drill string 29 inside the string is a pressure regulating valve 56. The valve 56 has the capability to prevent U-tubing of drilling fluid into the riser 6 when the pumping stops. This valve 56 is of a type that will open at a pre-set pressure and stay open above this pressure without causing significant pressure loss inside the drill string once opened with a certain flow rate through the valve.

An air compressor 70, a pump by which a pressure differential is created or maintained by transferring a volume of air from one region to another, is connected to the riser 6 above the surface BOP 6. The compressor 70 is capable of providing a sub-atmospheric pressure inside of the riser 6. Exhaust air, that may contain some amount of hydrocarbon can be led to the burner boom or other safe vent.

Included in the riser section 6 is an injection line 41, which runs back to the vessel/platform 24. This line 41 has a remotely operated valve 40 that can be controlled from the surface. The inlet to the riser 6 from the line 41 can be anywhere on the riser 6. The line 41 can extend parallel to the lines of the low riser return pumping system that is to be explained below.

The LRRS riser section 2 includes a drilling fluid return outlet 42a comprising at least one or more high-pressure riser outlet valve 38 and a hydraulic connector hub 39. The hydraulic connector hub 39 connects a low riser return pumping system 1 (FIGS. 2 and 3) with the high-pressure riser 6.

Figure 4:
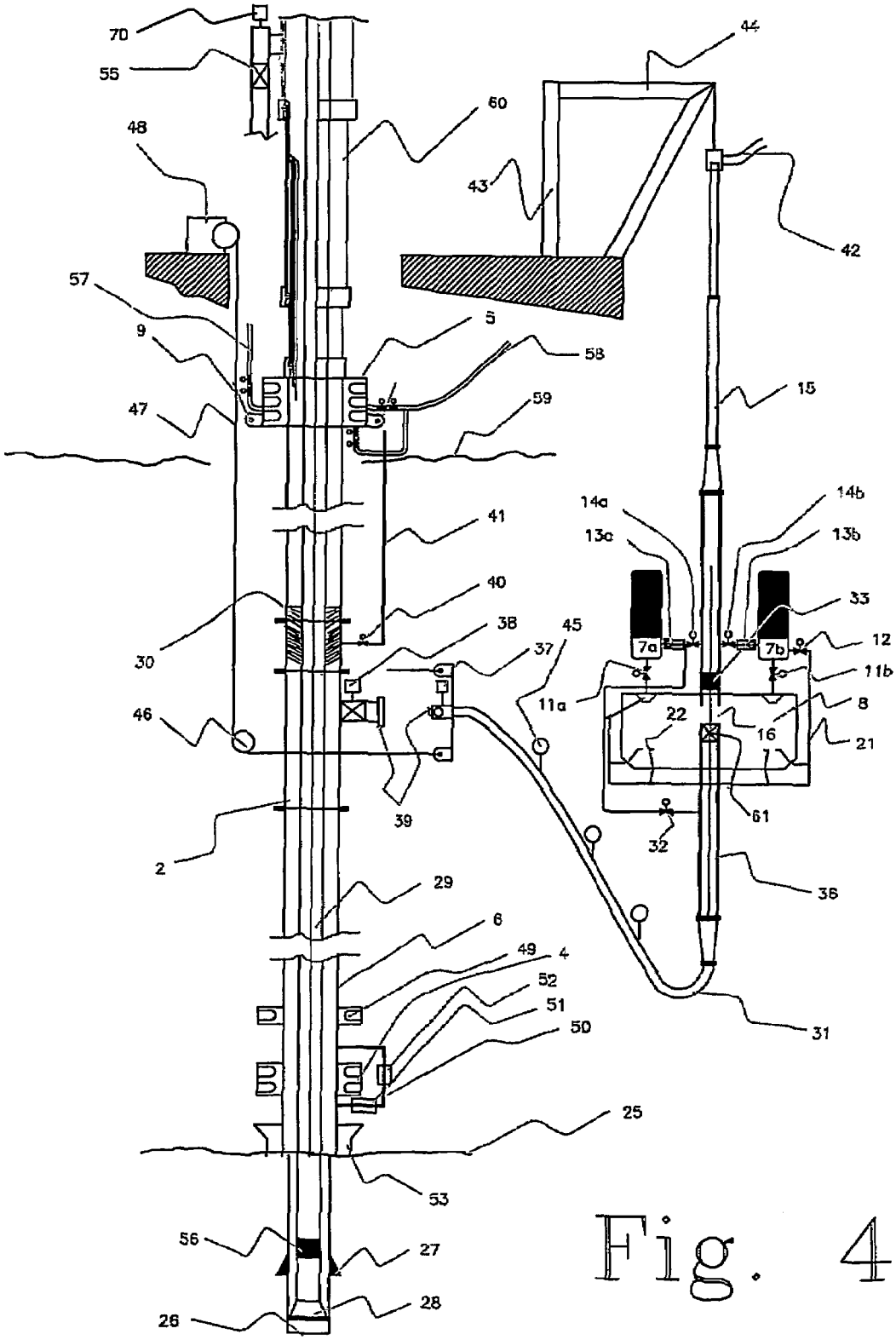
FIG. 4: in schematic detail the use of a pull-in device to be used together with the arrangement of FIG. 1.

The low riser return pumping system includes a set of drilling fluid return pumps 7a and 7b. The pumps are connected to the connector 39 via a gumbo/debris box 8, an LRRS mandrel 36 and a drilling fluid return suction hose 31 with a controllable non return valve 37. A discharge drilling fluid conduit 15 connects the pumps 7a and 7b with the drilling fluid handling systems (not shown) on the platform 24. As shown in FIG. 4, the top of the drilling fluid return conduit 15 is terminated in a riser suspension assembly 44 where a drilling fluid return outlet 42 interfaces the general drilling fluid handling system on the platform 24.

Figure 2:
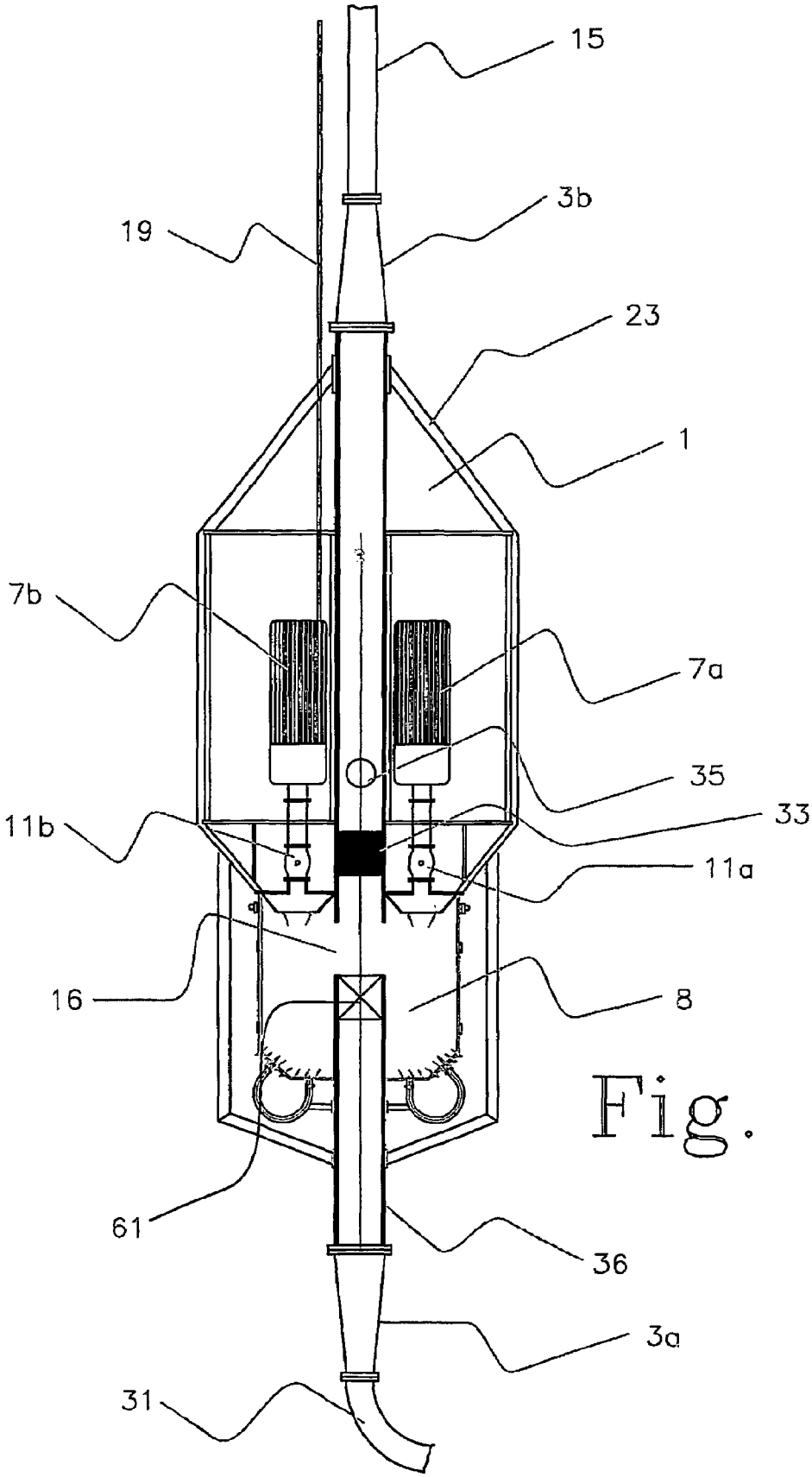
FIG. 2 a schematic diagram of and partial detail of the arrangement of FIG. 1.

The pump system 1 is shown in greater detail in FIG. 2.

The high-pressure valves 11a, b on the suction side of the pumps 7a, b, and high-pressure valves 14a, b and non return valves 13a, b on the discharge side of the pumps 7a, b, controls the drilling fluid inlet and outlet to the drilling fluid return pumps 7.

The gumbo debris box 8 includes a number of jet nozzles 22 and a jet and flushback line 21 with valves 12 to break down particle size in the box 8.

The LRRS mandrel 36 includes a drilling fluid inlet port 16 and a drilling fluid pump outlet port 35. A stress taper joint 3a is attached to either end of the LRRS mandrel 36.

As best shown in FIG. 2, the mud return pumps 7a, 7b are powered by power umbilical 19 or by seawater lines of a hydraulic system.

The fluid path for the drilling fluid return goes from the outlet 42, though the hose 31, into the mandrel 36, out through the drilling fluid inlet port 16 and into the gumbo box 8. The pumps are pumping the fluid from the gumbo box 8 out through the mud pump outlet port 35 and into the drilling fluid conduit 15 and back to the platform 24.

A dividing block/valve 33 is installed in the LRRS mandrel 36 acting as a shut-off plug between the mud return pump suction and discharge sides. The dividing valve/block 33 can be opened so as to dump debris into the gumbo box 8 to empty the return conduit 15 after prolonged pump stoppage. A bypass line 69 with valves 32 can bypass the non-return valves 13 when valve 61 is shut, making it possible to gravity feed drilling mud from the return conduit 15 into the riser 6 for riser fill-up purposes. Hence there are three riser fill-up possibilities, 1) From the top of the riser 2) through injection line 41 and through bypass line 69. In this system design the injection line 41 might also be run alongside the return conduit and connected to the riser at valve 40 with a ROV and /or to the bypass line 69.

The LRRS 1 is protected within a set of frame members forming a bumper frame 23.

By controlling the output of the pumps 7a, b, the mud level 30 (the interface between the drilling fluid and the air in the riser 6) in the high-pressure riser 6 can be controlled and regulated. As a consequence the pressure in the bottom hole 26 will vary and can thus be controlled.

Figure 3:
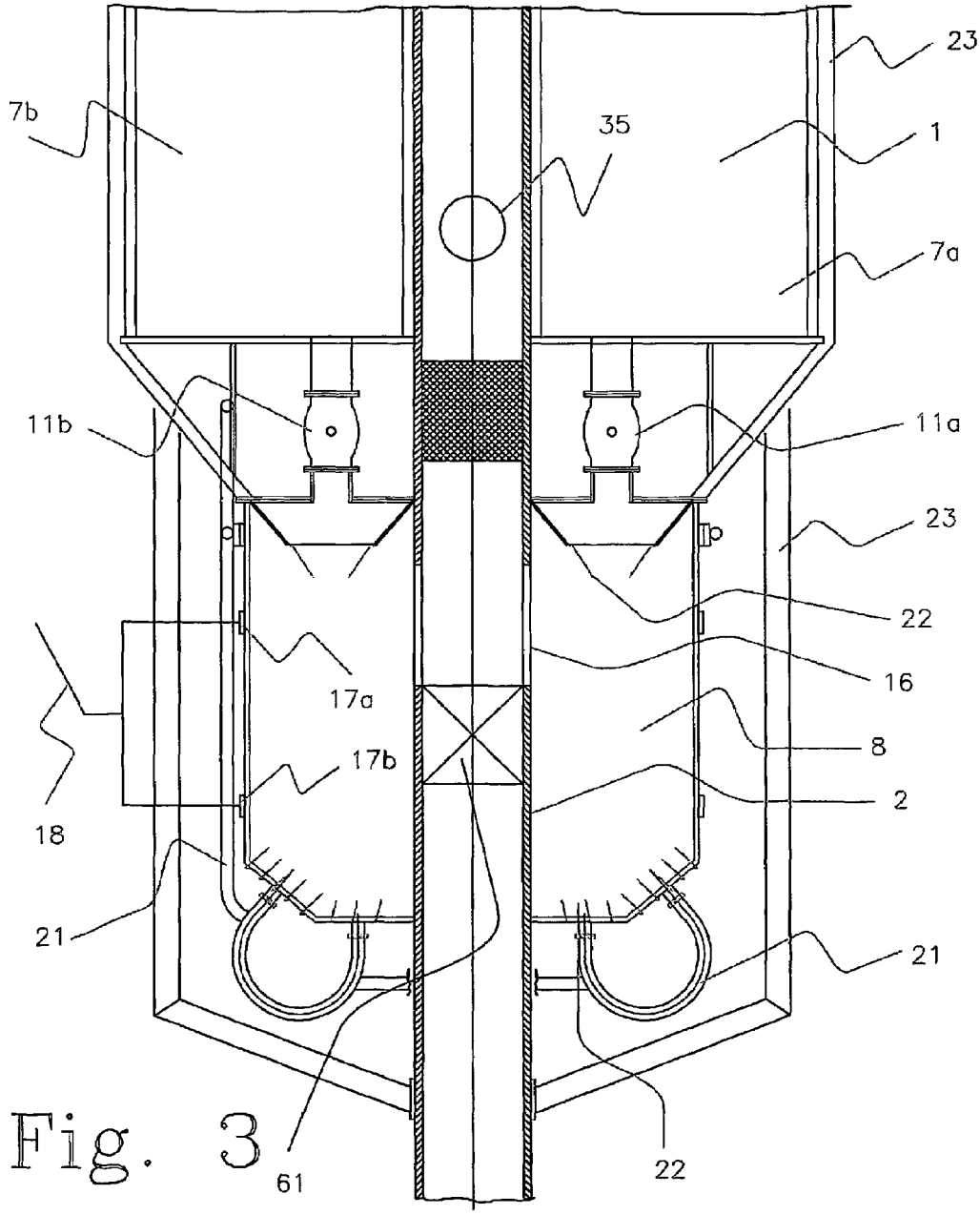
FIG. 3 a schematic diagram of and partial detail of the arrangement of FIG. 2.

FIG. 3 shows in even greater detail the lower part of the pump system 1. The level of gumbo or other debris in the gumbo debris tank 8 is controlled by a set of level sensors 17a, b connected to a gumbo debris control line 18 running back to the vessel or platform 24.

Reference is now made to FIG. 4. On the platform or vessel 24 a handling frame 43 for the discharge drilling fluid conduit 15 is installed. The LRRS 1 is deployed into the sea by the discharge drilling fluid conduit 15 or on cable until it reaches the approximate depth of the LRRS riser section 2. The system can also be run from an adjacent vessel (not shown) lying alongside the main drilling platform 24.

A pull-in assembly will now be described referring to FIG. 4. Attached to the end of the drilling fluid suction hose 31 is a pull-in wire 47 operated by a heave compensated pull-in winch 48. The pull-in wire 47 runs through a suction hose pull-in unit and a sheave 46. The end of the suction hose 31 is pulled towards the hydraulic connector 39 for engagement with the connector 39 by the pull-in assembly 46, 47, 48.

The drilling fluid suction hose 31 may be made neutrally buoyant by buoyancy elements 45.

The control system for determining the ECD and calculation of the intended lifting or lowering of the liquid/gas interface in the riser 6 will now be described referring to FIG. 5.

The bottom hole pressure is the sum of five components:

$$P_{bh}=P_{hyd}+P_{fric}+P_{wh}+P_{sup}+P_{swp}$$

Where:

$P_{bh}$=Bottom hole pressure
$P_{hyd}$=Hydrostatic pressure
$P_{fric}$=Frictional pressure
$P_{wh}$=Well head pressure
$P_{sup}$=Surge pressure due to lowering the pipe into the well
$P_{swp}$=Swab pressure due to pulling the pipe out of the well Controlling bottom hole pressure means controlling these five components.

The Equivalent circulation Density (ECD) is the density calculated from the bottom hole pressure $P_{bh}$)

$$\rho_E \cdot g \cdot h = P_{bh} \tag{1}$$

Where:

$\rho_E$=Equivalent Circulation Density (ECD) (kg/m3)
g=Gravitational constant (m/s$^2$)
h=Total vertical depth (m)

For a Newtonian Fluid, the pressure in the annulus can be calculated as follows assuming no wellhead pressure and no surge or swab effect:

$$P_{bh} = \rho_m \cdot g \cdot h + \frac{128 \cdot \eta \cdot L_1 \cdot Q}{\pi^2 \cdot (D_0 - d_{ds})^3 \cdot (D_0 + d_{ds})^2} \tag{2}$$

For a Bingham fluid, the following formula is used:

$$P_{bh} = \rho_m \cdot g \cdot h + \frac{128 \cdot \eta \cdot L_1 \cdot Q}{\pi^2 \cdot (D_0 - d_{ds})^3 \cdot (D_0 + d_{ds})^2} + \frac{16 \cdot \tau_0 \cdot L_1}{3 \cdot (D_0 - d_{ds})} \tag{3}$$

Figure 5:
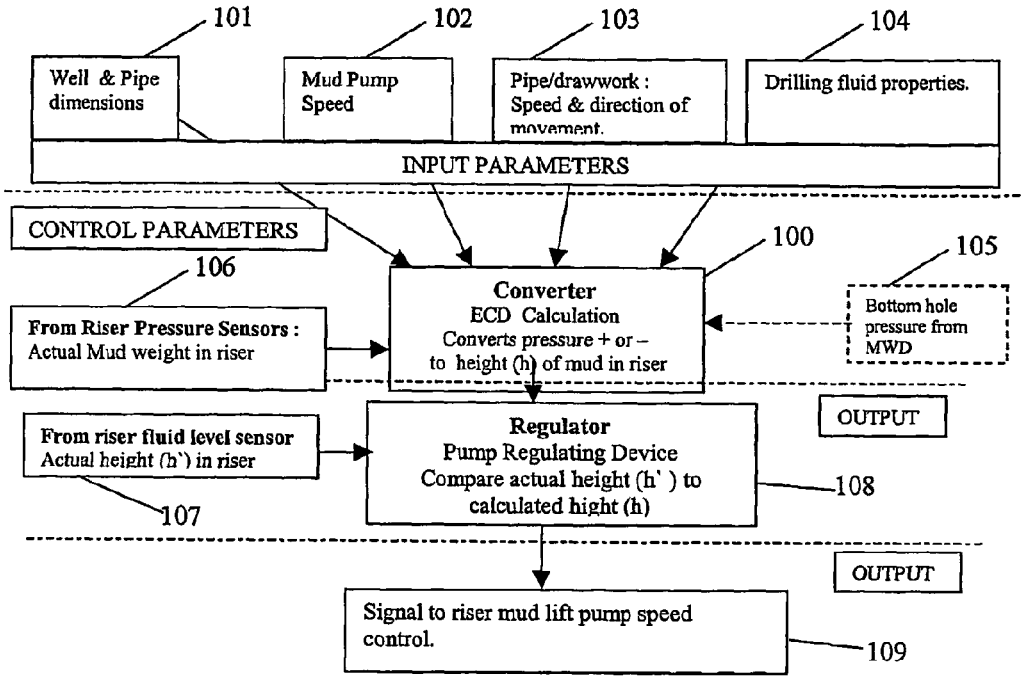
FIG. 5 an ECD (or downhole) process control system flow chart.

Where:

$\rho_m$=Density of drilling fluid being used
$\eta$=Viscosity of drilling fluid
$L_1$=Drillstring length
Q=Flowrate of drilling fluid
$D_0$=Diameter of wellbore
$d_{ds}$=Diameter of drillstring
g=Gravitational constant
h=Total vertical depth
$\tau_0$=Yield point of drilling fluid FIG. 5 is an is an illustration of parameters used to calculate the ECD/dynamic pressure and the height (h) of the drilling fluid in the marine drilling riser using the low riser return and lift pump system (LRRS).

From eq. 4 (Newtonian Fluid ), it is seen that in order to keep the bottom hole pressure $P_{bh}$) constant, an increase in flowrate (Q) requires the hydrostatic head (h) to be reduced.

$$P_{bh} = \rho_m \cdot g \cdot h + \frac{128 \cdot \eta \cdot L_1 \cdot Q}{\pi^2 \cdot (D_0 - d_{ds})^3 \cdot (D_0 + d_{ds})^2} + P_{sup} + P_{swp} \tag{4}$$

The expression for calculating swab and surge pressure is not shown in Eq. 4. However, when moving the drillstring into the hole, an additional pressure increase ($P_{sup}$) will take place due to the swab effect. In order to compensate for this effect, the hydrostatic head (h) and/or the flowrate (Q) would have to be reduced.

When moving the drill string out of the hole, a pressure ($P_{swp}$) drop will take place due to the surge effect. In order to compensate for this effect, the hydrostatic head (h) and/or the flowrate (Q) would have to be increased.

The swab and surge effects, are as described above, a result of drill string motion. This motion is not caused due to tripping only, but also due to vessel motion when the drill string is not compensated, i.e. make and break of the drill string stands.

FIG. 5 shows a flowchart to illustrate the input parameters to the converter indicated above, for control of bottom hole pressure (BBP) using the low return riser and lift pump system (LRRS) described above.

Into the converter 100 a set of parameters are put. The well and pipe dimensions 101, which are evidently known from the start, but may vary depending on the choice of casing diameter and length as the drilling is proceeding, the mud pump speed 102, which, e.g., may be measured by a sensor at each pump, pipe and draw-work movement (direction and speed) 103, which also may be measured by a sensor that, e.g., is placed on the draw-work main winch, and the drilling fluid properties (viscosity, density, yield point, etc.) 104.

The parameters 101, 102, 103, 104 are entered as values into the converter 100.

Additional parameters, such as bottom hole pressure 105, which may be the result of readings from Measurements While Drilling (MWD) systems, actual mud weight (density) 106 in the drilling riser, preferably resulting from calculations based on measurements by the sensors 10a and 10b, as explained above, etc., may also be collected before the needed hydrostatic head (level of interface between drilling fluid and air) (h) to gain the intended bottom hole pressure is calculated.

The needed hydrostatic head (h) is input to a comparator/regulator 108

The fluid level (h') in the riser is continuously measured and this parameter 107 is compared with the calculated hydrostatic head (h) in the comparator/regulator 108. The difference between these two parameters is used by the comparator/regulator 108 to calculate the needed increase or decrease of pump speed and to generate signals 109 for the pumps to achieve an appropriate flow rate that will result in a hydrostatic head (h).

The above input and calculations may take place continuously or intermittently to ensure an acceptable hydrostatic head at all times.

Figure 6:
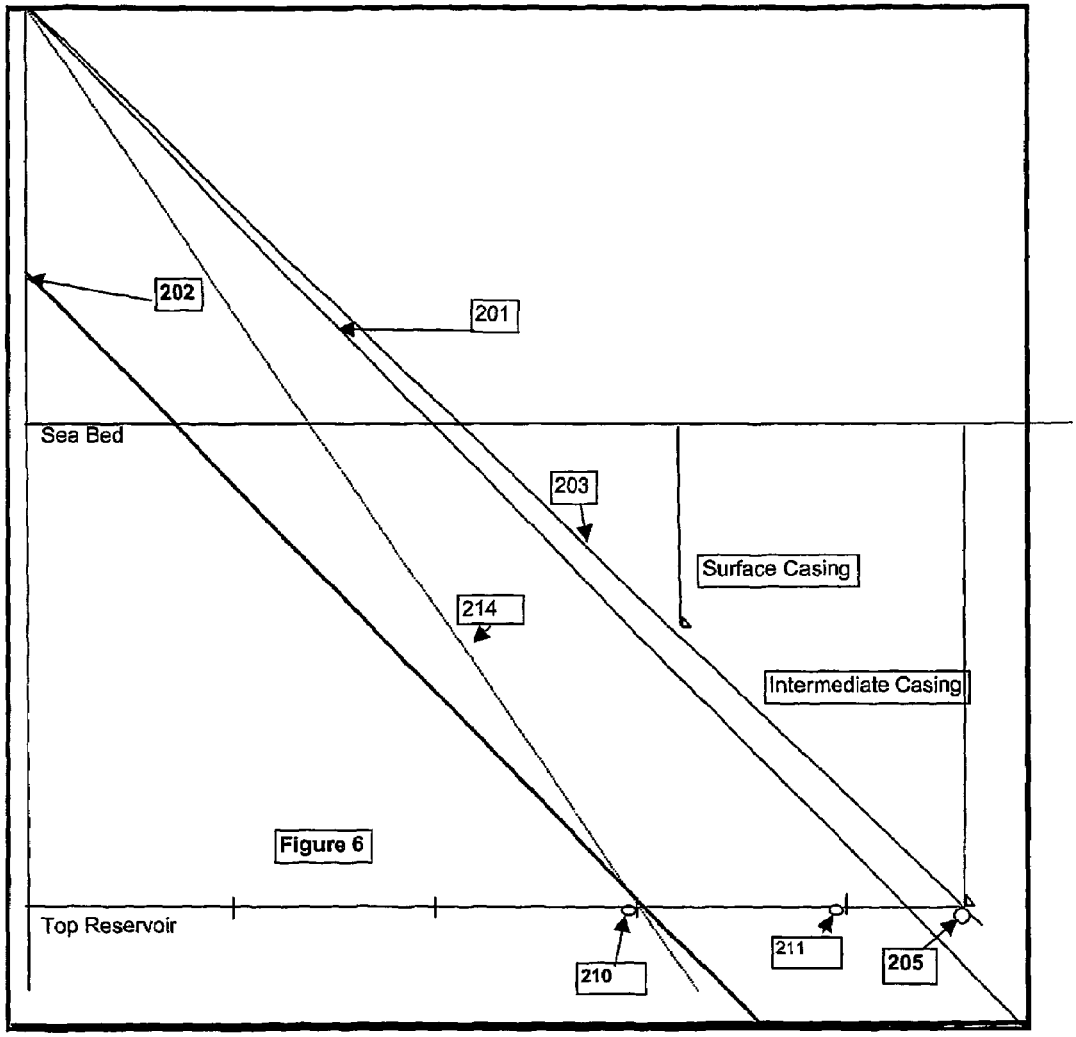
FIG. 6 a diagram illustrating the benefits from the improved method of drilling through and producing from depleted formations.
Figure 7:
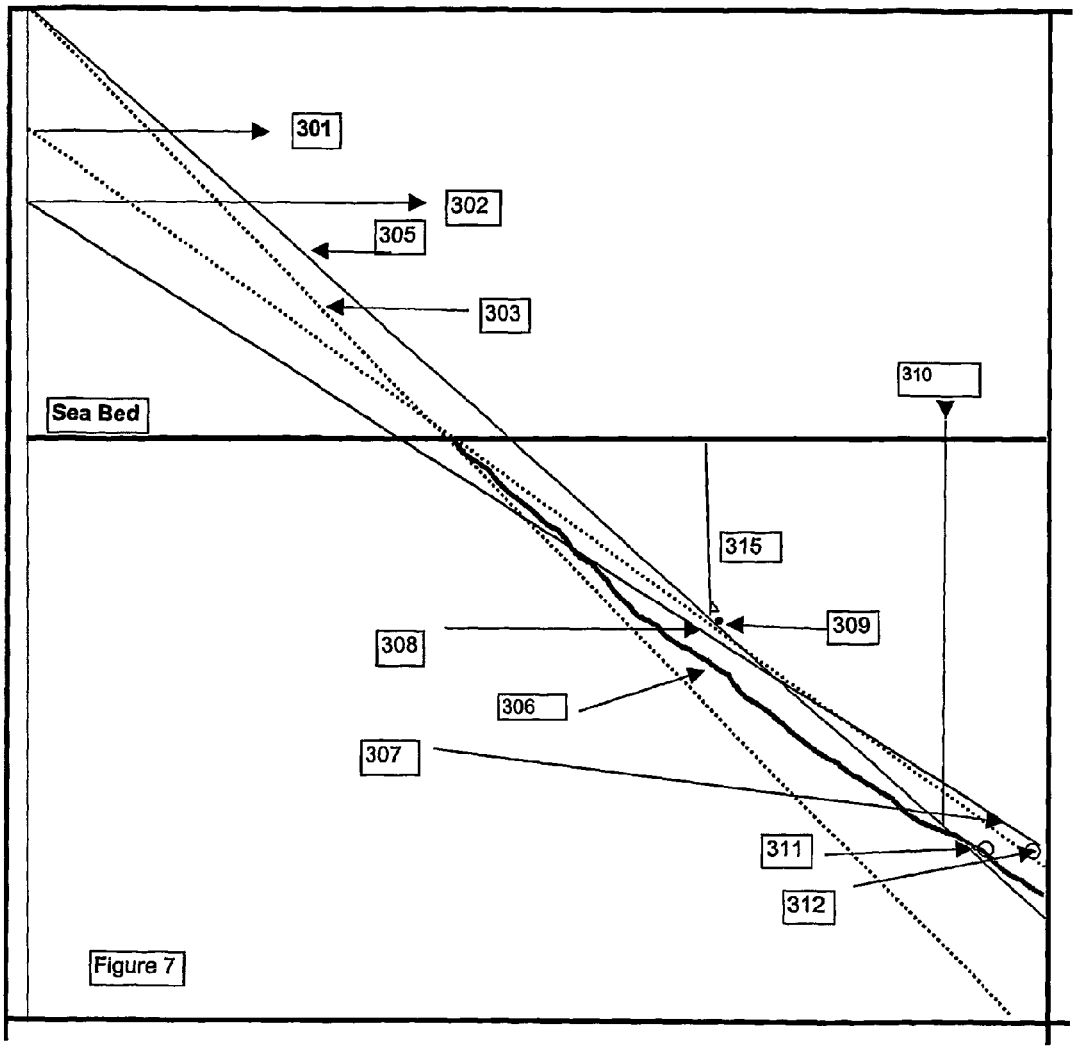
FIG. 7 a diagram illustrating the benefits the effects of the improved methods of controlling hydraulic pressures in a well being drilled.

Referring to FIGS. 6 and 7 some effects of the present invention on the pressure will be explained. In the figures the vertical axis is the depth from sea level, with increasing depth downward in the diagrams. The horizontal axis is the pressure. At the left hand side the pressure is atmospheric pressure and increasing to the right.

In FIG. 7 the line 303 is the hydrostatic pressure gradient of seawater. The line 306 is the estimated pore pressure gradient of the formation. In conventional drilling the mud weight gradient 305 indicates that a casing 310 have to be set in order to stay in between the expected pore pressure and the formation strength—the formation strength at this point being indicated by reference number 309—at the bottom of the last casing 315. If drilling with an arrangement and method according to the present invention, the gradient of the mud can be higher, as indicated by the line 310, which means that one can drill deeper.

If however, the pore pressure, indicated by 312, at some point should exceed the expected pressure, indicated by 311, a kick could occur. With the method of present invention the level can be dropped further, down to 302 and the mud weight further increased. The net result is a pressure decrease at the casing shoe 309 with an increase in pressure near the bottom of the hole, as indicated by 307, making it possible to drill further before having to set a casing.

In this way it is possible to reduce the pressure on weak formations higher up in the hole and compensate for higher pore pressures in the bottom of the hole. Thus it is possible to rotate the pressure gradient line from the drilling mud around a fixed point, for example the seabed or a casing shoe.

Another example of the ability of this system is shown in FIG. 6. In this situation a severely depleted formation 210 is to be drilled. The formation has been depleted from a pressure at 205 at which it was possible to drill using a drilling fluid slightly heavier than seawater (1,03 SG) as drilling fluid, with a pressure gradient shown at 203. The fracture gradient of the depleted formation is now reduced to 211, which is lower than the pressure gradient of seawater from the surface, as indicated by the line 201.

With the present invention drilling can be done without needing reduce the density of the drilling fluid substantially and having to turn the drilling fluid into gas, foam or other lighter than water drilling systems, as shown by the pressure gradient 214.

By introducing an air column in the upper part of the riser the upper level of the drilling fluid can be dropped down to a level 202. Ea the case shown a drilling fluid with the same pressure gradient as seawater 201 can be used, but starting at a substantially lower point, as shown by 202.

A pore pressured of 0,7 SG can be neutralized by low liquid level with seawater of 1,03 SG as shown by 202. This ability gives rise to great advantages when drilling in depleted fields, since reducing the original formation pressure of 1,10 SG at 205 to 0,7 SG at 210 by production, can also give rise to reduced formation fracture pressure, shown at 211, that can not be drilled with seawater from surface, as shown by 201. With the present invention the bottom-hole pressure exerted by the fluid in the well bore can be regulated to substantially below the hydrostatic pressure for water. With the prior art of drilling arrangements this will require special drilling fluid systems with gases, air or foam. With the present invention this can be achieved with a simple seawater drilling fluid system.

It should be apparent that many changes may be made in the various parts of the invention without departing from the spirit and scope of the invention and the detailed embodiments are not to be considered limiting but have been shown by illustration only. Other variations will no doubt occur to those skilled in the art upon the study of the detailed description and drawings contained herein. Accordingly, it is to be understood that the present invention is not limited to the specific embodiments described herein, but should be deemed to extend to the subject matter defined by the appended claims, including all fair equivalents thereof.

The invention claimed is:

1. A drilling system for compensating for changes in equivalent mud circulation density (ECD) or dynamic pressure in an annulus bore in a well resulting from drilling activities during subsea drilling at great water-depths, comprising:

a high pressure drilling riser extending from a seafloor wellhead to near the surface;

a near surface BOP at the upper end of the drilling riser, the near surface BOP having an upper high pressure line;

a subsea outlet in communication with the interior of the riser at a point above the seafloor wellhead;

a flow return conduit running back to the surface;

a pumping system suspended above the seafloor and connecting said subsea outlet to said flow return conduit;

a valve adapted to isolate the riser from the pumping system;

means for converting changes in pressure in said riser to an equivalent change in height of drilling fluid in the riser;

means for adjusting the pump rate of said pumping system according to the difference of the height of drilling fluid in said riser and said equivalent change in height of drilling fluid; thereby adjusting the height of drilling fluid in the drilling riser so as to neutralize the changes in pressure in said annulus bore created by said drilling activities by varying the actual amount of drilling fluid in the riser; *and* a subsea shut-off device at the sea floor, the shut off device having at least one by-pass line providing communication between the well below the shut-off device and the interior of the riser, the by-pass line containing at least one shut-off valve.

2. A system according to claim 1, further comprising a gas bleeding outlet connected to a choke line in communication with a high pressure choke and stand pipe manifold on a drilling vessel.

3. A system according to claim 1, wherein the pumping system with flow return line is adapted to be launched and run with the riser.

4. A system according to claim 1, further comprising a filling line coupled to the riser substantially below sea level and above said subsea outlet, the filling line being adapted for filling the riser with a gas or liquid.

5. A system according to claim 4, wherein the gas is an inert gas for displacement of the air above the drilling fluid.

6. A system according to claim 1, further comprising a valve in the flow return conduit, and a particle collection box in the flow return line, the valve being adapted for opening and closing the communication between the particle collection box and the flow return conduit.

7. A system according to claim 6, wherein the particle collection box is hanging underneath the pumping system and the particle collection box has a re-circulation and jetting means for breaking down particle size to prevent particle build up.

8. A method for compensating for equivalent mud circulation density (ECD) or dynamic pressure increase or decrease in an annulus bore in a well during subsea drilling at great water-depths resulting from drilling activities, comprising the steps:

maintaining the pressure in the top of a drilling riser extending from a seafloor wellhead to the surface at equal to or lower than atmospheric pressure, said riser configured with a seabed BOP and bypass;

*monitoring bottom hole pressure in the well for a change in pressure created by drilling activities;* converting [a] *the* change in pressure in the well created by drilling activities to an equivalent change in height of drilling fluid in the riser;

adjusting the pump rate of a drilling fluid return pump suspended above the seafloor and connected at a point above the seafloor wellhead to the drilling riser so as to adjust the height of drilling fluid in the drilling riser by the equivalent change in height of drilling fluid so as to neutralize the change in pressure created by the drilling activities by varying the actual amount of drilling fluid in the riser.

9. A method according to claim 8, wherein gas escaping from an underground formation is separated from liquid during offshore drilling, comprising the steps:

permitting gas and drilling fluid in a drilling riser extending from a seafloor wellhead to the surface to form a gas/liquid interface within the drilling riser;

providing a liquid outlet below the gas/liquid interface level and substantially above the seafloor wellhead, said outlet being connected to a pumping system suspended above the seafloor and hence to a return conduit, providing a gas outlet above the gas/liquid interface level, closing a near surface BOP at the upper end of the drilling riser[,] and pumping liquid out of the drilling riser through the liquid outlet, whereby the drilling riser is acting as a gas separator.

10. A method according to claim 9, wherein a flow return line between the liquid outlet and the pumping system is adapted to prevent free gas from entering the return conduit by having a [U-shaped] *V-shaped* loop acting as a gas-lock.

11. A method according to claim 10, where the height of the gas-lock can be adjusted by varying the subsea level of the pumping system.

12. A method according to claim 9, wherein the level of the gas/liquid interface between the drilling fluid and the gas in the drilling riser is maintained below sea level so that the pressure in the bottom of the well is lower than the hydrostatic pressure exerted by seawater from sea level.

13. A method according to claim 12, wherein the drilling riser comprises sensors for monitoring the height of the gas/liquid interface level in the riser, the sensors being coupled to a regulating means controlling the pump rate of the pumping system and thereby controlling the height of the gas/liquid interface level.

14. A method according to claim 8, said change in pressure occurring in said riser by drilling activities comprising a change in pressure created by the drill string being moved up or down in the well.

15. A method according to claim 8, said change in pressure in said drilling riser being created by circulation of drilling fluid through the bit.

16. A method for controlling equivalent mud circulation density (ECD) in a well during subsea drilling operations, comprising:

using a high pressure drilling riser extending from a seafloor wellhead and subsea BOP to the surface, within which there is drilling fluid present, there being no outside kill or choke lines extending from the surface to the subsea BOP, said subsea BOP configured with a bypass;

maintaining the pressure in the top of the drilling riser at equal to or lower than atmospheric pressure;

monitoring the height of drilling fluid in the riser;

monitoring bottom hole pressure in the well for a change in pressure;

calculating an equivalent change in height of drilling fluid to the change in pressure;

using a drilling fluid pump suspended above the seafloor and connected to the riser substantially above the seafloor wellhead and below the height of drilling fluid, adjusting the height of drilling fluid in the riser by the equivalent change in height of drilling fluid, thereby adjusting the drilling fluid level in the drilling riser so as to reverse the change in the bottom hole pressure.

17. A drilling system for controlling equivalent mud circulation density (ECD) in a well resulting from drilling activities during subsea drilling operations, comprising:

a high pressure drilling riser extending from a seafloor wellhead to the surface and having a surface BOP at the upper end of the drilling riser, the surface BOP having an upper high pressure line, there being no kill or choke lines extending from the surface to the seafloor wellhead;

a subsea outlet in communication with the interior of the riser at a point above the seafloor wellhead;

a flow return conduit running back to the surface;

a pumping system suspended above the seafloor and connecting the subsea outlet to the flow return conduit;

a valve adapted to isolate the riser from the pumping system;

means for monitoring the height of drilling fluid in the drilling riser;

means for sensing a change in pressure in the drilling riser;

means for converting the change in pressure in the drilling riser to an equivalent change in height of drilling fluid in the riser;

means for adjusting the pump rate of the pumping system according to the difference of the height of drilling fluid in the drilling riser and the equivalent change in height; thereby adjusting the height of drilling fluid in the drilling riser so as to neutralize the change in pressure by varying the actual amount of drilling fluid in the riser; and a subsea shut-off device at the sea floor; the shut off device having at least one by-pass line providing communication between the well below the shut-off device and the interior of the riser, the by-pass line containing at least one shut-off valve or pressure regulating valve.

* * * * *